Nov. 23, 1965

M. E. SPATT 3,218,820

AIR CONDITIONING APPARATUS FOR BUSES AND OTHER
VEHICLES, ESPECIALLY TO ARRANGEMENT AND
SUPPORT OF HIGH SIDE OF
REFRIGERATING SYSTEM

Filed Aug. 14, 1964

INVENTOR
MILTON E. SPATT

BY

J.B. Feeshin
ATTORNEY.

Nov. 23, 1965     M. E. SPATT     3,218,820
AIR CONDITIONING APPARATUS FOR BUSES AND OTHER
VEHICLES, ESPECIALLY TO ARRANGEMENT AND
SUPPORT OF HIGH SIDE OF
REFRIGERATING SYSTEM
Filed Aug. 14, 1964     5 Sheets-Sheet 2
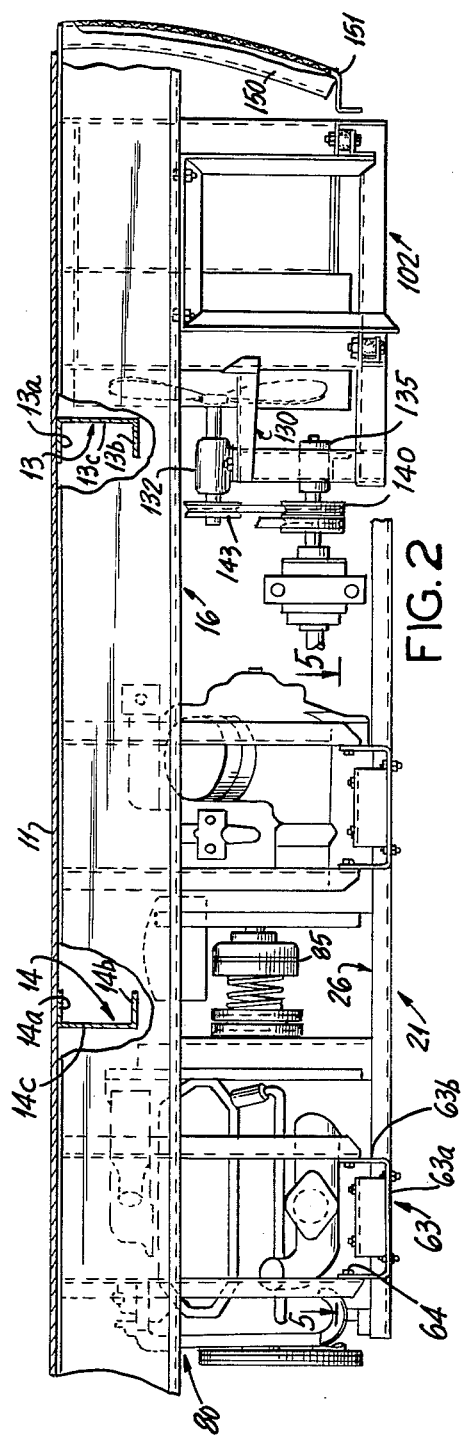
INVENTOR.
MILTON E. SPATT
BY
J.B. Felshin
ATTORNEY.

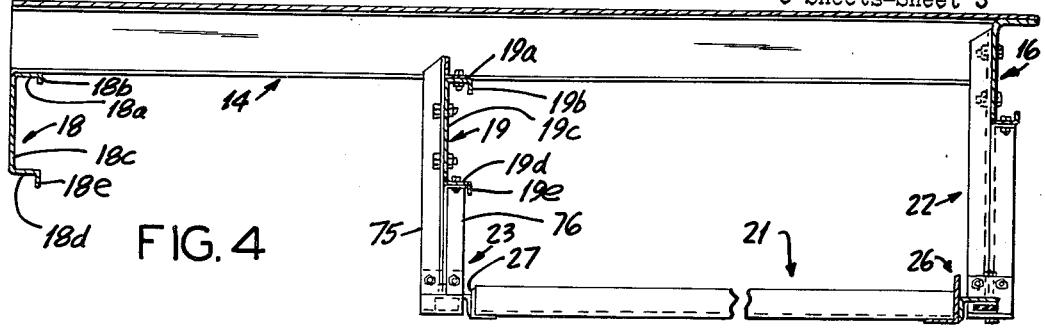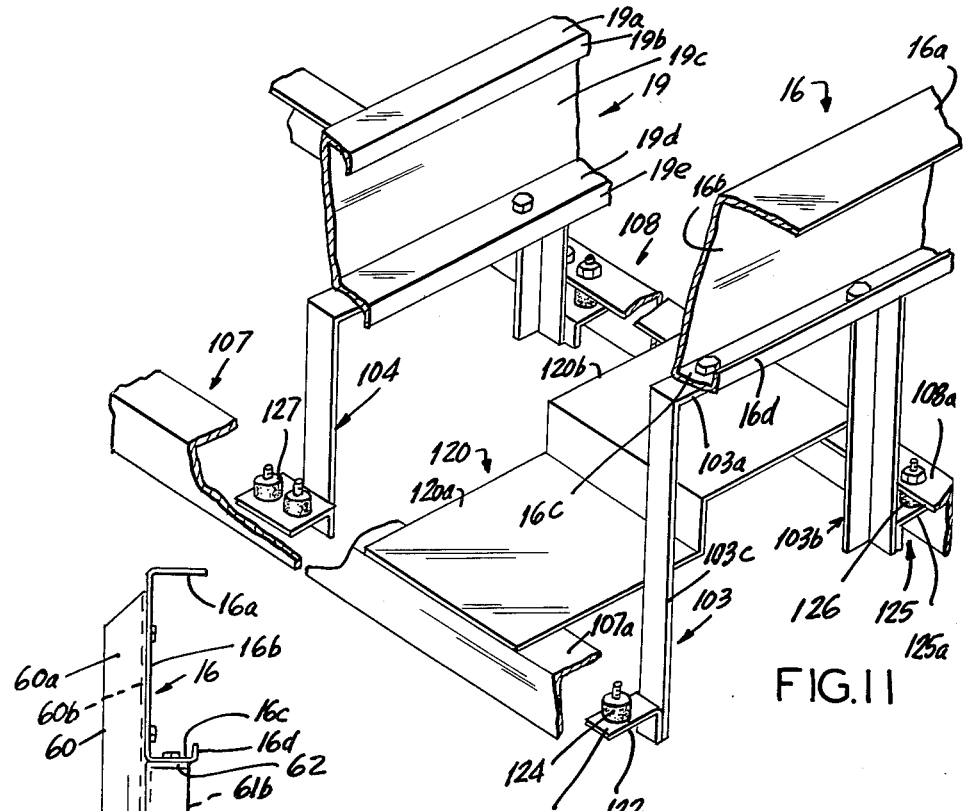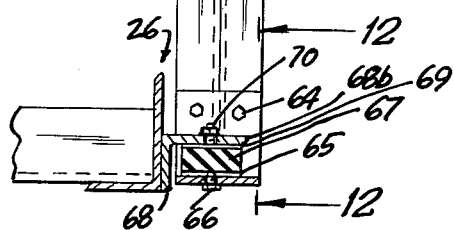

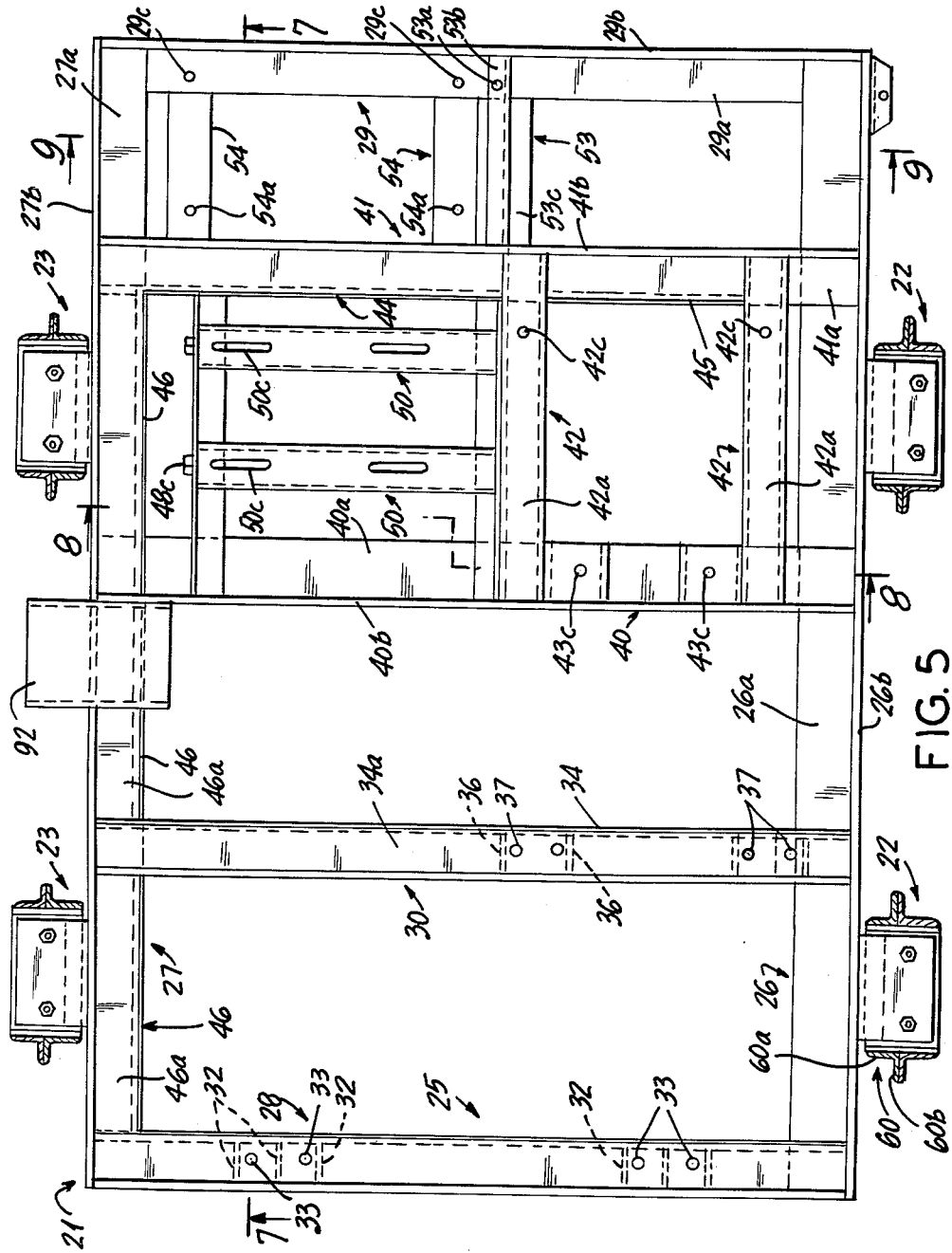

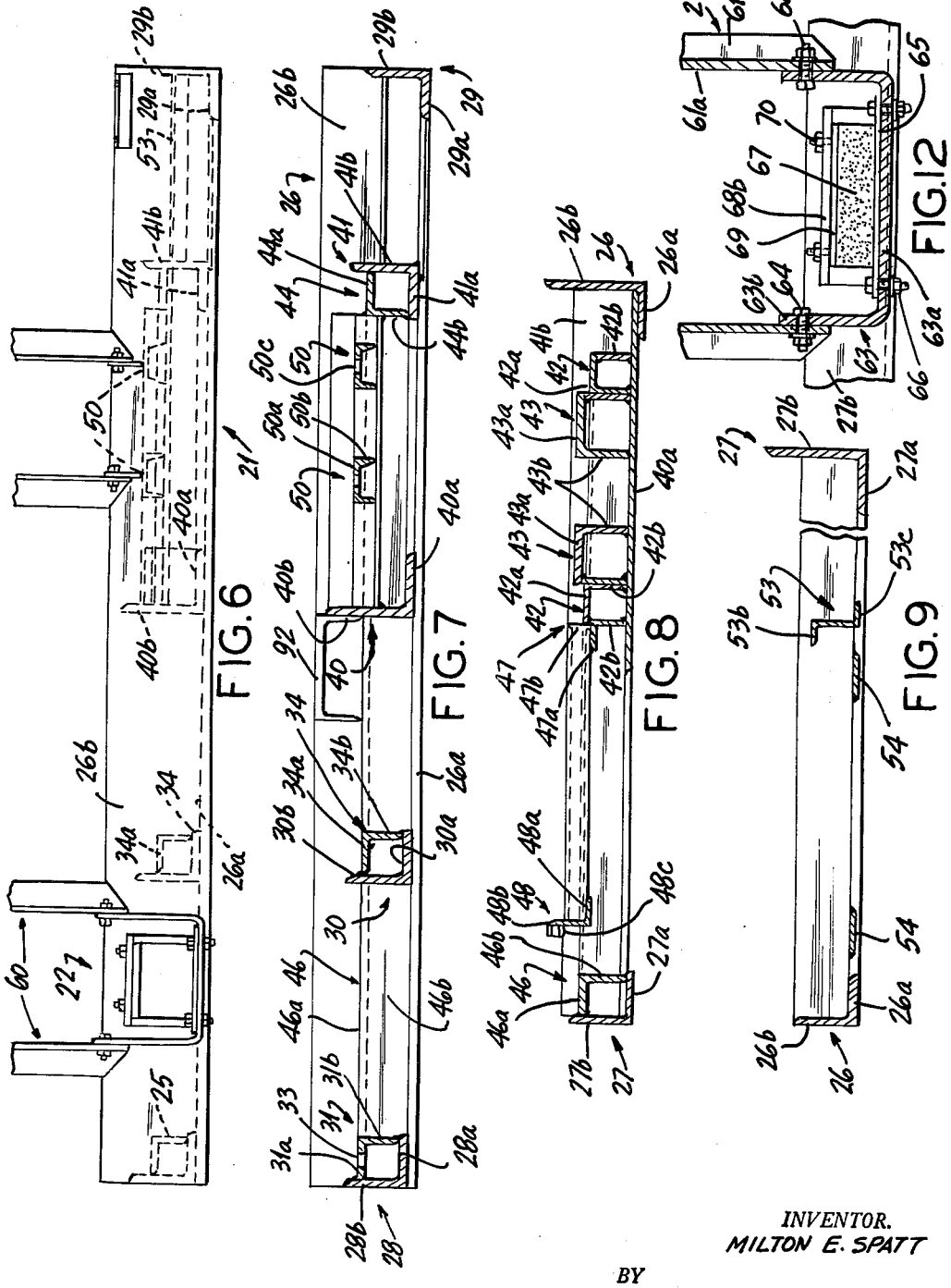

United States Patent Office 3,218,820
Patented Nov. 23, 1965

3,218,820
AIR CONDITIONING APPARATUS FOR BUSES AND OTHER VEHICLES, ESPECIALLY TO ARRANGEMENT AND SUPPORT OF HIGH SIDE OF REFRIGERATING SYSTEM
Milton E. Spatt, c/o Wayne Cooling Equipment Corp., 25 Jay St., Brooklyn, N.Y.
Filed Aug. 14, 1964, Ser. No. 389,660
9 Claims. (Cl. 62—239)

This invention relates to air conditioning apparatus for buses and other vehicles. It is particularly directed to the arrangement and support of the high side of the refrigerating system for said apparatus.

One object of this invention is to improve the air conditioning apparatus disclosed in my copending application for patent Serial No. 302,031 filed August 14, 1964, for Air Conditioning Means for Vehicles.

Another object of this invention is to provide in an air conditioning apparatus for a bus or other vehicle, a high side of the refrigerating system so compactly arranged and so supported beneath the floor of the vehicle that it does not interfere with the usual operating or structural parts of the vehicle, nor does it require removal or alteration of any structural members now on the bus, and yet allows ample space therebeneath.

Another object of this invention is to provide air conditioning apparatus that may readily be prefabricated and easily attached to structural parts of the bus after fabrication, to thereby simplify the installation.

Still another object of this invention is to provide apparatus of the character described which may readily be incorporated into the bus with the blowers for the combined condenser-radiators blowing air in from the side of the bus.

Yet another object of this invention is to provide in a structure of the character described, one platform hung by means of shock absorbers from the bus floor supporting means, on which platform are mounted an engine, compressor and generator and their drive connection to the engine, receiver and oil tank; and a second platform hung by means of shock absorbers from said frame and supporting the condensers, radiators, blower fans and their drive connections therefor.

Another object of this invention is to provide a complete high side system mounted as a package unit which can be easily installed under and to the body members of the bus simply with several bolts and nuts.

Still another object of this invention is that component parts of the air conditioning system consisting of a structural iron frame on which are mounted a compressor, electrical generator, coupling, bearings and drive shafts, can be installed in the bus without cutting or alteration of any of the main or auxiliary body members of the bus.

Still another object of this invention is that component parts of the air conditioning system consisting of a structural iron frame containing condensers, fans, bearings, shafts, pulleys and belts can be installed in the bus without cutting or alteration of any of the main or auxiliary body members of the bus.

A further object of this invention is to provide a strong and durable construction of the character described which shall be relatively inexpensive to manufacture, easy to install and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention:

FIG. 2 is a cross-sectional view taken on line 2—2 of FIG. 1;

FIG. 3 is a cross-sectional view taken on line 3—3 of FIG. 1;

FIG. 4 is a cross-sectional view taken on line 4—4 of FIG. 1;

FIG. 5 is a cross-sectional view taken on line 5—5 of FIG. 2;

FIG. 6 is a front view of the lower portion of the platform shown in FIG. 5;

FIG. 7 is a cross-sectional view taken on line 7—7 of FIG. 5;

FIG. 8 is a cross-sectional view taken on line 8—8 of FIG. 5;

FIG. 9 is a cross-sectional view taken on line 9—9 of FIG. 5;

FIG. 10 is an enlarged view of part of FIG. 4, but in cross-section;

FIG. 11 is a partial perspective view of the mounting of the platform for supporting the condensers, radiators and blowers therefor; and FIG. 12 is a cross-sectional view taken on line 12—12 of FIG. 10.

Figure 1:
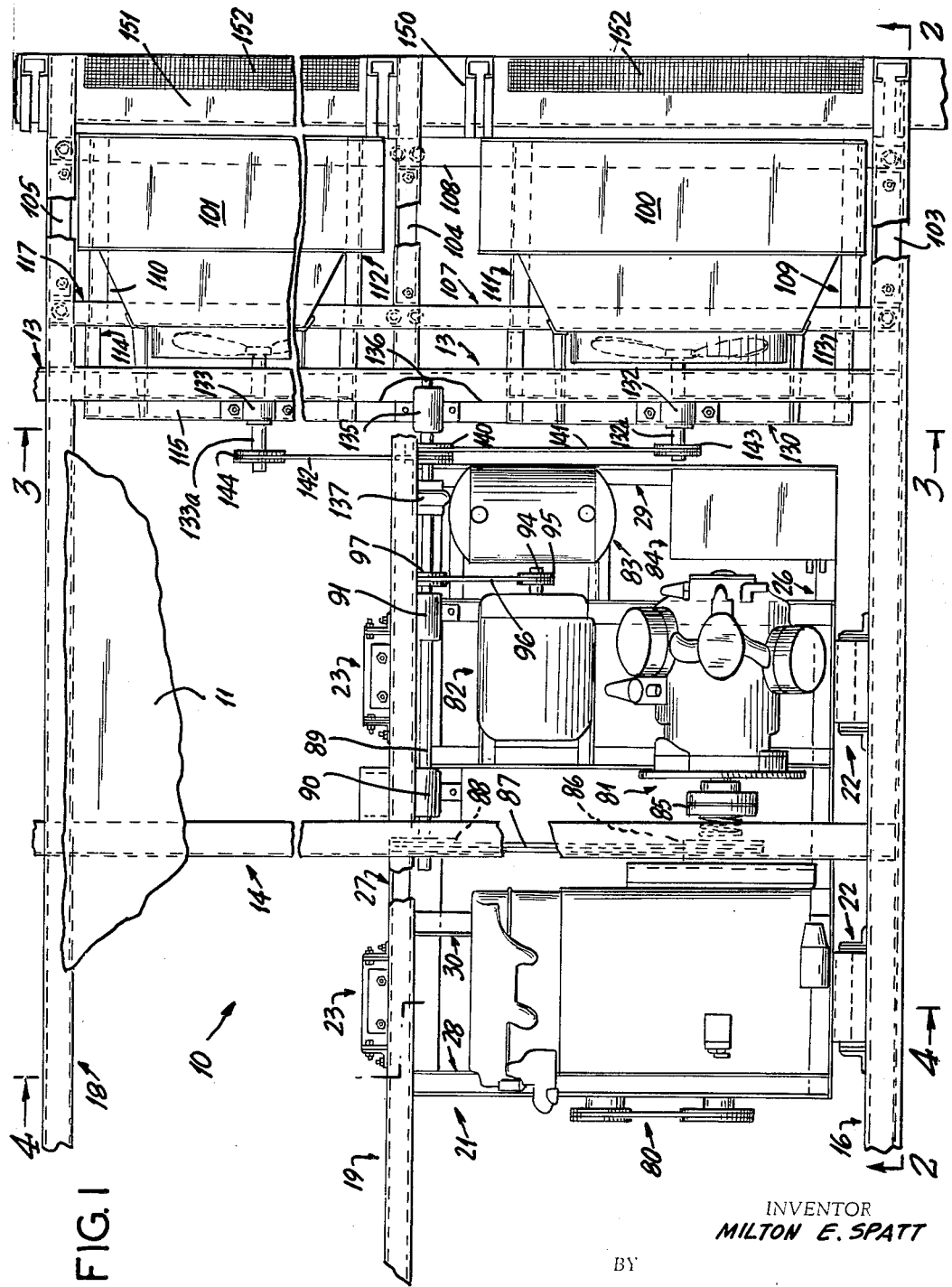
FIG. 1 is a top plan view of an installation of the high side of an air conditioning system embodying the invention, with parts of the bus flooring broken away.

Referring now in detail to the drawing, 10 designates a bus or other vehicle having a flat horizontal wall 11 which may be the floor of the vehicle. Said floor 11 is supported by a pair of inwardly facing similar, symmetrical longitudinal channel beams 13 and 14 which form part of the vehicle frame. Beam 13 has a top horizontal flange 13a, a bottom horizontal flange 13b and a vertical web 13c. Beam 14 has a top flange 14a, a bottom flange 14b and a web 14c. Welded to the adjacent end edges of beams 13, 14 at one side of the bus, is a transverse beam 16 now on the bus.

Beam 16 has a top horizontal flange 16a in the plane of the flanges 13a, 14a from which extends a vertical web 16b projecting down below the level of webs 13b, 14b. Extending from web 16b is a bottom wall 16c from which extends upwardly a narrow flange or rib 16d.

The beams 13, 14 are furthermore mounted on a pair of transverse beams 18 and 19 parallel to and coextensive with beam 16 and forming part of the frame of the vehicle which supports the flooring and chassis thereof.

Beam 18 is located beneath the adjacent opposite ends of beams 13, 14 and beam 19 is located beneath said beams 13, 14 intermediate the ends thereof.

Beam 18 has a top wall 18a contacting the undersides of said beams 13, 14 and formed with a downwardly extending rim flange 18b. Extending down from top wall 18a is a web 18c in a vertical plane through the end edge of said beams 13, 14. Extending from the lower end of web 18c is a bottom wall 18d from which a rim flange 18e extends downwardly.

Beam 19 is substantially similar to beam 18a and has parts 19a, 19b, 19c, 19d, 19e corresponding to parts 18a, 18b, 18c, 18d, 18e of beam 18.

It will be understood that beams 13, 14, 16, 18, 19 and flooring 11 may be part of an existing bus or other vehicle on which the apparatus 20 embodying the invention may be mounted.

Said apparatus 20 comprises a first platform 21 which may be supported by means of pairs of hangers 22, 23 from said beams 16, 19, respectively.

Platform 21 comprises a rectangular frame 25. Frame 25 comprises parallel transverse angle irons 26, 27 interconnected by end angle irons 28, 29. Angle iron 26 comprises a bottom flange 26a from which extends a flange 26b in a vertical plane. Flange 27 comprises a bottom flange 27a in a horizontal plane from which a flange 27b in a vertical plane extends.

Angle iron 28 comprises a bottom flange 28a from which a flange 28b extends up in a vertical plane. The ends of flange 28a are on top of flanges 26a, 27a.

The end edges of flange 28b contact the inner surfaces of flanges 26b, 27b.

Angle iron 29 has a bottom flange 29a in a horizontal plane, and extending upwardly therefrom is a vertical flange 29b. The ends of flange 29a abut inner edges of flanges 26a, 27a. The outer ends of flange 29b abut inner surfaces of flanges 26b, 27b.

Angle irons 26, 27, 28, 29 are welded together to form frame 25.

Disposed parallel to and spaced from angle iron 28, is an angle iron 30 comprising a bottom flange 30a the ends of which are located on flanges 26a, 27a. Extending up from flange 30a is a flange 30b. The ends of flanges 30a, 30b abut the inner surfaces of flanges 26b, 27b and are welded thereto. Angle iron 30 is spaced from angle iron 28 about one-quarter the length of frame 25.

Welded to angle iron 28 and coextensiwe therewith, is an angle iron 31 having a top flange 31a parallel to flange 28a, and from which extends down a flange 31b the lower end edge of which substantially coincides with the outer edge of flange 28a. The longitudinal edges of flanges 31a, 31b are welded to flanges 28b, 28a respectively.

About a quarter of the way inwardly from each of the opposite ends of angle irons 28 are three spaced vertical rectangular plates 32 disposed within the tubes formed by angle irons 28, 31 and welded thereto. Top flange 31a is formed with holes 33 between each pair of adjacent vertical plates.

An angle iron 34 coextensive with angle iron 30, has a top flange 34a from which a flange 34b extends downwardly. Angle iron 34 is welded to angle iron 30 and forms a tube therewith. Spaced pairs of vertical plates 36 are welded in such tube. The top flange 34a is formed with holes 37 between said plates. The purpose of the holes 33, 37 will be explained hereinafter.

About half-way from the ends of frame 25, is an angle iron 40 parallel to angle iron 30 and comprising bottom flange 40a from which flange 40b extends upwardly. Flange 40a rests on flanges 26a, 27a.

Spaced from angle iron 29 is an angle iron 41 comprising a bottom flange 41a from which a vertical flange 41b extends. Flanges 40a, 41a extend toward each other and rest on the flanges 26a, 27a and are welded thereto.

Angle irons 40, 41 are interconnected by a pair of parallel longitudinal channel-shaped members 42 the ends of which rest on flanges 40a, 41a and the end edges of which abut flanges 40b, 41b. Channels 42 each have a top web 42a from which flanges 42b extend downwardly. One member 42 is located close to angle iron 26 and the other is located short of a line midway from angle irons 26, 27. Flanges 42a are each formed with a hole 42c.

On flange 40a and contacting outer flanges 42b of members 42 are a pair of channels 43, each having a top web 43a from which flanges 43b projected downwardly. Flanges 43b are each formed with an opening 43c. Longitudinally affixed to flange 41a are a pair of angle irons 44, 45. Said angle iron 44 has a top flange 44a in a horizontal plane from which a flange 44b in a vertical plane extends downwardly. Angle iron 44 is located between flange 27b and adjacent member 42.

On flange 27d of angle iron 27 are longitudinally mounted angle irons 46, one disposed between angle irons 31, 30 and one between angle irons 34, 40 and a third disposed between flange 40a and member 44. Each angle iron 46 has a top flange 46a from which a vertical flange 46b extends downwardly.

Member 45 is located between said members 42 and is similar in transverse cross section to member 44.

A longitudinal member 47 of angular cross section interconnects flanges 46b with member 44. It comprises a horizontal flange 47a from which a flange 47b extends upwardly. Flange 47b is welded to an adjacent member 42 (located near the center line between angle irons 27, 26.

A second longitudinal member 48 of angle-shaped cross section has a horizontal flange 48a in the plane of flange 47a and extends toward the same. Extending up from flange 48a is a flange 48b. Angle member 48 is located close to angle iron 27. Nuts 48c are fixed to the outer side of flange 48b.

Interconnecting members 47, 48 are a pair of parallel transverse channel-shaped members 50. Each member 50 has a top web 50a from which parallel flanges 50b. The ends of the lower edges of flanges 50b rest on flanges 47a, 48a of members 47, 48, respectively. The ends of members 50 abut flanges 47b, 48b of members 47, 48 and are welded thereto. Webs 50a are each formed with a pair of longitudinal slots 50c.

As shown in FIGS. 5 and 9, flange 41b is connected to flange 29 as by a Z-shaped longitudinal member comprising a vertical intermediate portion 53a, a top flange 53b and a bottom flange 53c; are interconnected by a pair of longitudinal bars or plates 54 located between Z-bar 53 and angle iron 27.

Bars 54 each have a hole 54a. Bar 53 has a hole 53a in the top flange 53b thereof.

Flange 29a has a pair of holes 29c, located opposite the holes 54a.

The hangers 22, 23 for supporting the frame or platform 21 from the truck frame or chassis are located two on each side of the platform.

Hangers 22 each comprise a pair of symmetrical vertical angle irons 60 each having a flange 60a and a flange 60b. The upper ends of flanges 60b are bolted or otherwise attached to the inner surface of web 16b of beam 16, and project therebelow to just above the level of frame 21. Attached to flanges 60b below beam 16 are vertical angle irons 61 having flanges 61a and 61b. Flanges 61b contact flanges 60b. The lower ends of angles 60 and 61 are at the same horizontal level. Flanges 60a, 61d are coplanar. A cross bar 62 bolted to the underside of wall 16c interconnects the upper ends of flanges 61a. The lower ends of angles 60, 61 are interconnected by a U-shaped strap member 63 having a bottom wall 63a from which arms 63b extend upwardly and are bolted to the lower ends of said flanges 60a, 61a as at 64. A plate 65 is bolted to the top of wall 63a as at 66. On plate 65 is a shock absorbing block 67.

Welded to the flange 26a of angle iron 26 are angles 68, each having a vertical flange 68a from which a horizontal flange 68b extends. Attached to the underside of each flange 68b is a plate 69, as by bolts 70; each plate 69 contacts the top of a block 69. Blocks 69 may be adhered to plates 65, 69.

Hangers 23 comprise vertical angle members 75 (see FIG. 4) bolted to web 19c of beam 19, and vertical angle members 76 welded to members 75, both terminating at some lower level below angle iron 27. A strap similar to strap 63 is bolted to the lower ends of angle members 75, 76 and carries a lower plate similar to 65. Angles similar to angles 68 are welded to flange 27b of angle 27, and carry plates similar to plates 69, with shock absorbing rubber-like blocks similar to block 67 between the upper and lower plates. A plate or bar similar to bar 62 is bolted to the underside of wall 19d and interconnects the upper ends of angles 76, as shown in FIG. 4.

Frame 21 supports an engine 80, compressor 81, generator 82, receiver 83 and lube oil tank 84 all forming part of the high side of a refrigerating system.

The engine 80 is bolted by means of bolts (not shown) passing through openings 33 and 37 to members 28, 31 and 30, 34. The compressor 81 is bolted by bolts (not shown) passing through openings 43c, 42c to members 43, 42.

The generator 82 is bolted by bolts (not shown) passing through slots 50c to members 50, in adjusted position.

The receiver 83 is bolted by bolts (not shown) passing through openings 54a, 29c to members 54 and 29.

The lube oil tank 84 is supported on flanges 29a, 26a and on the lower flange 53c of member 53.

Said engine and compressor have coaligned rotary shafts parallel to angle iron 26, and coupled together by coupling 85. On the engine shaft is a pulley 86 belted by belt 87 to a pulley 88 on a horizontal shaft 89 parallel to said engine and compressor shafts, and pournalled in bearings 90, 91. Bearing 90 is mounted on a plate 92 fixed on top of member 46 which is located between members 30, 34 and 40. Bearing 91 is supported on member 44 adjacent angle iron 27.

The generator 82 has a rotary shaft 94 carrying a pulley 95 belted by belt to a pulley 97 located just beyond bearing 91. Thus the engine 80 drives the compressor 81 as well as the generator 82.

The high side of the refrigerating system further comprises a pair of condenser-radiators 100, 101 supported on a second frame or platform 102 suspended by hangers 103, 104, 105 from beams 16, 19, 18 respectively.

Frame or platform 102 comprises a pair of parallel angle members 107, 108 parallel to beam 13 and interconnected at their ends by end angle irons 109, 110 and by intermediate angle irons 111, 112.

Welded to angle iron 107 are end angle extensions 113, 114, the ends of which are interconnected by an angle iron 115 disposed parallel to angle iron 107. Members 107, 108 extend beyond member 109 as shown in FIGS. 1 and 12. Attached to member 110 is an endwise frame extension 117. Members 107, 108 are interconnected by a pair of supporting plates 120 on each of which a condenser radiator 100, 101 is mounted. Support 120 has a lower level part 120a attached to member 107, and an upper level part 120b attached to member 108, as shown in FIG. 12.

Hanger 103 may be made of angle-shaped stock and has a top portion 103a bolted to wall 16c of beam 16, a downwardly extending vertical arm 103b the lower end of which projects below member 110, and a second downwardly extending arm 103c which extends below member 107. Member 108 may be at a somewhat higher level than member 107.

Welded to arm 103c is an angle member 122 having a horizontal flange 122a disposed beneath the horizontal flange 107a of member 107. On said flange 122a is a shock absorber block 124 of rubber or rubberlike material interposed between flange 122a and said flange 107a. Welded to the lower end of arm 103b is an angle 125 having a horizontal flange 125a projecting below horizontal flange 108a of member 108. A block 126 of rubber or rubberlike material is interposed between flanges 125a, 108a.

Hanger 104 is like hanger 103 except that it is fixed to wall 19b of beam 19. Two blocks 127 of rubber or like shock absorbing material are interposed between the angle attached to the lower arms of said hanger, and the flanges 107a, 108a of members 107, 108, respectively.

Hanger 105 is bolted to wall 18d of beam 18 and like hangers 103, 104 has downward extendnig arms to the lower ends of which angles are fixed. Blocks 130 of rubber or like shock absorbing material are interposed between such angles and the extension 117.

Thus frame 102 is suspended by shock absorbing means from the frame or chassis of the bus.

On angle member 115 are a pair of spaced brackets 130, 131. Bracket 130 comprise a top horizontal portion 130a from which downwardly and outwardly inclined legs 130b extend. The lower ends of legs 130a are welded to member 115 of frame 102.

Bracket 131 has a top portion 131a from which legs 131b are inclined downwardly and outwardly and are welded to member 115 of frame 102. On portions 130a, 131a are bearings 132, 133 in which are journalled shafts 132a, 133a carrying fans 132b, 133b, respectively for the condenser-radiators 100, 101, respectively.

On member 115 is mounted a bearing 135 in which is journalled a shaft 136 aligned with and connected to shaft 89 by a flexible coupling 137.

On shaft 136 is a double pulley 140 belted by belts 141, 142 to pulley 143, 144 carried by shafts 132a, 133a, respectively.

Attached to the side of the bus body in any suitable manner are a plurality of channels 150 which are curved downwardly and inwardly and project below the floor of the bus. A side apron or sheet metal bus body part 151 is fixed to said channels 150. Said side wall is provided with screens 152 aligned with the outlet ends of the condenser-radiators 100, 101 so that air blown by fans 132b, 133b past said condenser-radiators may flow through said screens from the side of the bus.

It will thus be seen that there is provided an article in which the several objects of this invention are achieved, and which is well adapted to meet the conditions of practical use.

As possible embodiments might be made of the above invention, and as various changes might be made in the embodiment above set forth, it is to be understood that all matter herein set forth, or shown in the accompanying drawings, is to be interpreted as illustrative and not in a limiting sense.

I claim:

1. A vehicle comprising a chassis frame, a platform, hanger means attached to said frame, to suspend said platform beneath said frame, an engine mounted on the platform, a compressor mounted on the platform, said engine and compressor having coaligned shafts, means to couple said shafts together, bearing means on said platform, a shaft journalled in said bearing means and disposed parallel to said coaligned shafts, a generator mounted on said platform and disposed between said compressor and journalled shaft, means to belt said coaligned shafts to said journalled shaft, means to belt the generator to said journalled shaft, a second platform hanger means attached to said frame to suspend said second platform beneath said chassis frame and adjacent said first platform, condenser-radiators mounted on said second platform, a shaft journalled on said second platform, flexible coupling means connecting the shaft on the second platform to said journalled shaft, fan shafts carrying fans to blow air on said condenser-radiator, rotatably mounted on said second platform, and means to belt said shaft on the second platform to said fan shafts.

2. The combination of claim 1, said hanger means for suspending said first platform including shock absorbers, and said hanger means for suspending said second platform including shock absorbers.

3. A platform, an engine mounted thereon, a compressor mounted on said platform, said engine and compressor having coaligned shafts, means to couple said shafts, a generator mounted on said platform and having a shaft parallel to said coupled shafts, bearing means on said platform, a shaft journalled on said bearing means and disposed parallel to said generator shaft, said generator being located between said journalled shaft and said compressor, means to drivingly connect said coupled shafts to said journalled shaft, means to drivingly connect said generator shaft to said journalled shaft, a second platform, a pair of condenser-radiators on said second platform, a pair of bearings on said second platform, fan shafts on said pair of bearings, fans on said fan shafts, for blowing air on said condenser-radiators, a third bearing on said second platform, a third shaft journalled in said third bearing, means to drivingly connect said third shaft to said fan shafts, and flexible coupling means to connect said journalled shaft to said third shaft.

4. In combination with a vehicle chassis comprising beams, two opposed pairs of hangers fixed to said beams, each hanger comprising a pair of portions projecting down from a beam of said chassis, and a bottom portion interconnecting the lower ends of said pair of portions, a block of shock absorbing material on each bottom portion, a platform between said opposed pairs of hangers, means fixed to the platform and projecting between the pair of portions and above the bottom portion of each hanger and overlying the block on said bottom portion, an engine, compressor and generator forming part of the high side of a refrigerator system mounted on said platform, said engine and compressor having coaligned coupled shafts, and means to drivingly connect said shafts to the generator, said platform comprising a rectangular frame having side portions connected by end portions, a portion parallel to one end portion and interconnecting said side portions, said engine being mounted on said interconnecting portion and said end portion, another pair of portions interconnecting said side portions, a plurality of longitudinal portions parallel to said side portions and interconnecting said first pair of portions, said compressor being mounted on one pair of said longitudinal portions, short transverse portions interconnecting a pair of said longitudinal portions, and said generator being mounted on said short transverse portions.

5. The combination of claim 4, and a receiver mounted on said frame.

6. In combination with a vehicle chassis comprising beams, two opposed pairs of hangers fixed to said beams, each hanger comprising a pair of portions projecting down from a beam of said chassis, and a bottom portion interconnecting the lower ends of said pair of portions, a block of shock absorbing material on each bottom portion, a platform between said opposed pairs of hangers, means fixed to the platform and projecting between the pair of portions and above the bottom portion of each hanger and overlying the block on said bottom portion, an engine, compressor and generator forming part of the high side of a refrigerator system mounted on said platform, said engine and compressor having coaligned coupled shafts, and means to drivingly connect said shafts to the generator, a second platform, a plurality of hangers fixed to said beams, each hanger having a pair of downwardly extending portions from which horizontal portions extend, blocks of shock absorbing material on said horizontal portions, said second platform having portions overlying said blocks, condenser-radiators mounted on said second platform, fan means rotatably mounted on said second platform, and means to drivingly connect said coupled shafts to said fan means.

7. A platform comprising a rectangular frame having parallel side portions interconnected by parallel end portions, a portion interconnecting said side portions and disposed parallel to one end portion, an engine mounted on said one end portion and interconnecting portion, a pair of parallel portions between said interconnecting portion and the other end portion and interconnecting said side portions, a plurality of longitudinal portions parallel to said side portions and interconnecting said pair of portions, a compressor mounted on a pair of said longitudinal portions, said engine and compressor having coaligned coupled shafts, short transverse portions parallel to said end portions and interconnecting a pair of said longitudinal portions, a generator mounted on said short transverse portions and having a shaft parallel to said coupled shafts, bearing means mounted on one of said side portions, a shaft journalled on said bearing means, said generator being located between said compressor and journalled shaft, and being provided with a shaft parallel thereto, drive means to connect said coupled shafts to said journalled shaft, and drive means to connect said journalled shaft to said generator shaft.

8. The combination of claim 7, longitudinal portions connecting one of said pair of parallel portions with said other end portion, and a receiver mounted on said last-mentioned longitudinal portions.

9. The combination of claim 8, and an oil tank mounted on said frame between said receiver and said other side portion and adjacent said other end portion.

References Cited by the Examiner

UNITED STATES PATENTS

| | | | |
|---|---|---|---|
| 2,106,515 | 1/1938 | Wanamaker | 62—323 |
| 2,148,596 | 2/1939 | Weiland | 62—295 |
| 2,190,249 | 2/1940 | Beline | 62—295 |
| 2,660,865 | 12/1953 | Durant | 62—239 |
| 2,668,421 | 2/1954 | Elfving | 62—323 |
| 2,746,267 | 5/1956 | Sellstrom | 62—243 |
| 2,910,840 | 11/1959 | Miller | 62—323 |
| 2,954,877 | 10/1960 | Seveynor | 62—297 |
| 3,057,171 | 10/1962 | Hulse | 62—239 |
| 3,100,384 | 8/1963 | Lowensohn | 62—243 |

WILLIAM J. WYE, *Primary Examiner.*